Patented Oct. 20, 1936

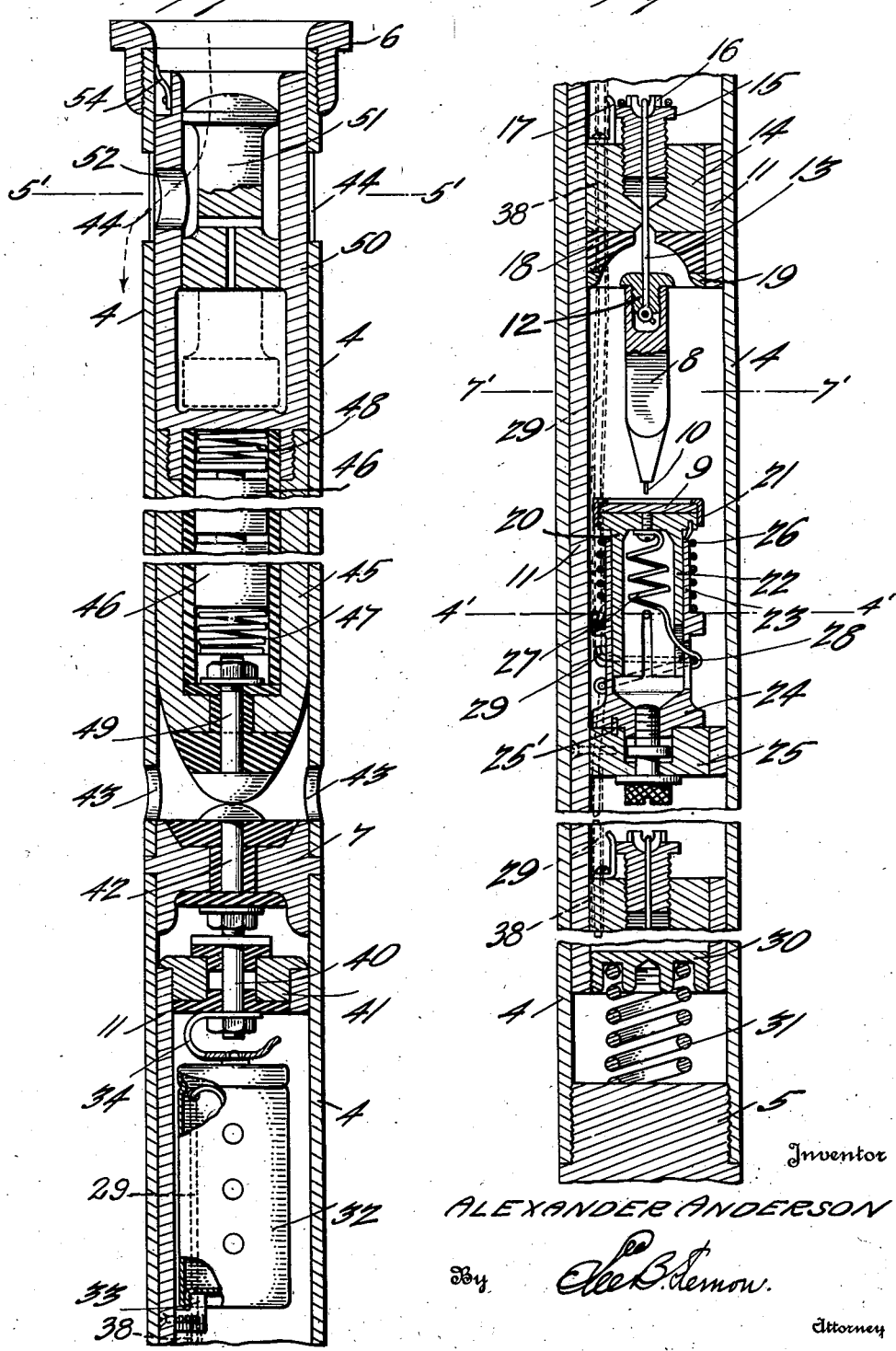

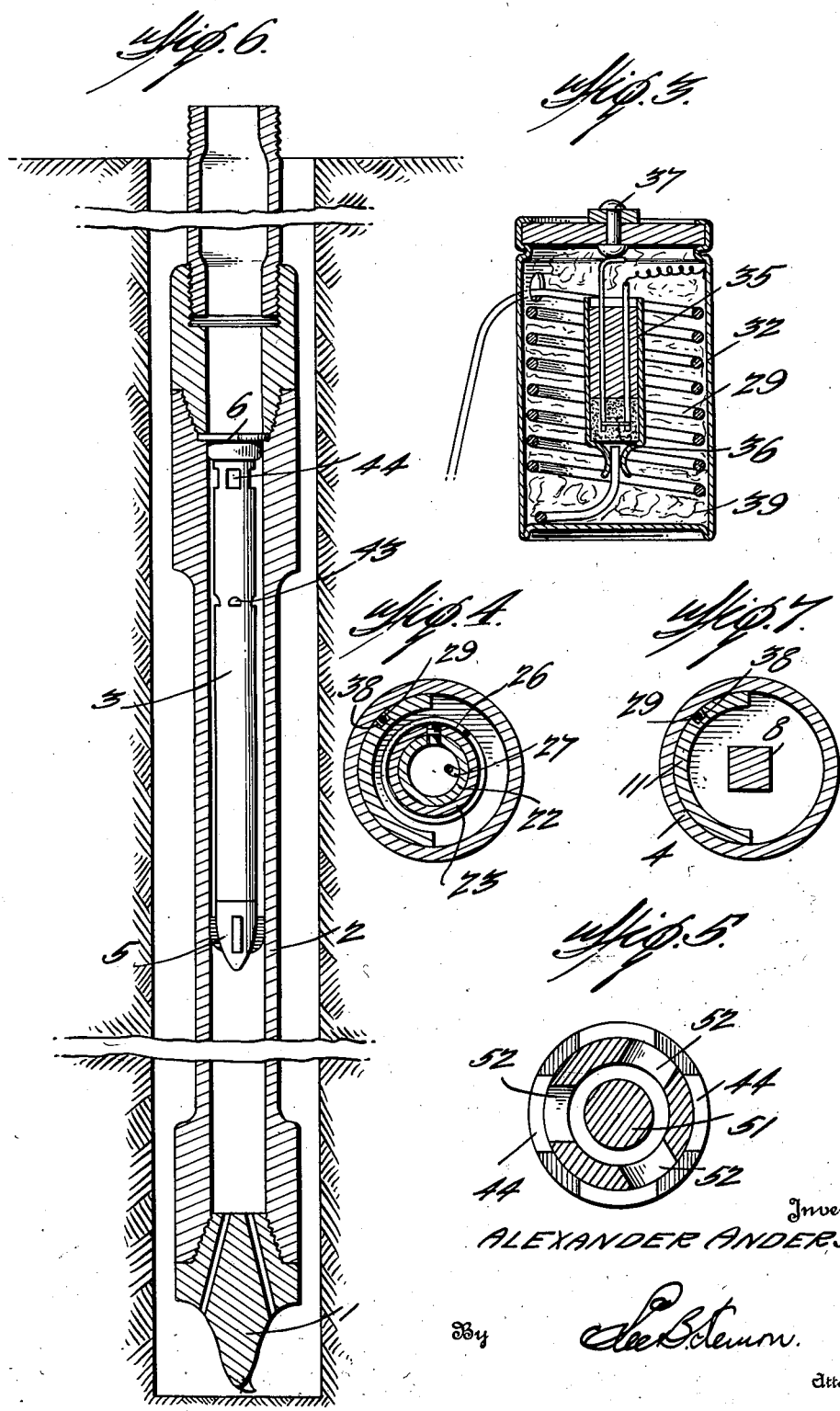

2,058,286

UNITED STATES PATENT OFFICE 2,058,286

APPARATUS FOR SURVEYING BORE HOLES

Alexander Anderson, Fullerton, Calif.

Application March 25, 1931, Serial No. 525,286

17 Claims. (Cl. 33—205.5)

This invention relates to apparatus for effecting desired operations at points which are not directly accessible and are indirectly accessible only with difficulty in wells or earth borings, certain features of the invention relating particularly to apparatus for surveying bores of great depth drilled to obtain oil and gas; and certain features of the invention are directed to the initiating of the action of devices employed to effect the desired operations at such points, and are not limited to use with the devices with which they are shown although they cooperate therewith in novel and advantageous respects.

The drilling of a deep oil well proceeds in stages, the drilling tool or bit being withdrawn from the well from time to time.

It is useful, and frequently necessary, to have an accurate record of the amount of the inclination of each such stage of the bore or of each part of such stage, and it is particularly valuable and time saving to have available at the time the bit is withdrawn from the bore, a record of the amount of the inclination of the far end of the bore hole.

During drilling operations, mud-laden water is pumped downward within the bore in contact with the pipe carrying the bit, passing downward within the pipe and upward between the exterior of the pipe and the interior of the bore hole, or vice versa, subjecting the pipe, and particularly the lower end thereof, and any apparatus associated therewith, to extreme pressures. During the drilling, the pipe and particularly the lower end thereof is subjected to extreme longitudinal and rotational strains and shocks.

An object of this invention is to provide apparatus whereby various desired effects and operations may be caused to occur at various points within bore holes and which are operable and effective in spite of the difficulties imposed by the conditions existing in the bore hole and the conditions due to the drilling thereof, a specific object being to provide apparatus useful in the surveying of bore holes to make and preserve records showing the amount of inclination of any desired portion or stage of a bore hole.

A feature of this invention is that for the purpose of effecting a desired operation, such as the making of surveying records at a point within a bore hole, apparatus is inserted in the line of pipe which carries the drill or other tool at a chosen point such as a point near the tool; or the apparatus may be supported at or near the end of the line of pipe.

It is proposed that the apparatus for effecting the desired operation shall be positioned within the pipe at the desired point of its support therein before that part of the pipe is lowered into the bore; or the apparatus is designed to be dropped into or moved along the line of pipe in the course of a drilling operation, and passing along the pipe will come to an appropriate supported position, e. g. resting on the drill point, where it may be rendered operative to make a record of inclination of the boring at that point.

A further feature of the invention is that the constructional details of the apparatus are such that it is well adapted to withstand the extremely high hydrostatic pressures and temperatures, as well as the rotational and longitudinal strains and shocks encountered by the apparatus in its association with a line of pipe used in the drilling of bores of great depth.

A further feature of the invention is that the apparatus is so constructed that it is capable of remaining inoperative in the drill pipe for substantial periods of time when it is desired that it shall be inoperative, and is capable of being set into operation at will while subjected to the conditions incident to its use in association with drilling tools.

This invention possesses various additional features of which some are mentioned at this point and of which others will be apparent from the more detailed description of embodiments of this invention which are hereinafter described for the purpose of assisting in the understanding of the invention but to which the invention is not limited. Thus, a feature of this invention which may advantageously be employed in connection with the foregoing features is that the steps and apparatus for effecting the desired operations within the bore are electrically effected or electro-responsive; and a specific feature is that the initiation of the operation of the apparatus employed for effecting the desired result is electrically controlled, and that such electrical control is effected without the use of an electric circuit including wires or cables extending from the device to the exterior of the bore, the use of such wires or cables being usually prohibited by the conditions existing in connection with the use of sectional pipe for the handling of tools and apparatus in deep or long bore holes. A feature of this invention, is that the steps and apparatus for initiation of the operation of a device, are capable of use in the initiation of the operation of a single device or of a plurality of devices successively. When electro-responsive devices are employed for effecting desired operations, the initiating of the operation of the electro-responsive device may be effected in various ways in accordance with this invention. Thus, the device for effecting the desired operation or operations may include a local circuit associated with the device, and that circuit may be rendered operative or closed by means of a separate body moved relatively to the apparatus as by being brought to a position adjacent to or in contact with a part of the apparatus. The said separate body may take any appropriate form of device which can be dropped into, or moved along the line of pipe until it comes into contact with the electro-responsive device to initiate the operation of the latter; and such device may be constructed to house and contain a source of electric current, e. g. a battery or batteries, to furnish current to energize or initiate the operation of the electro-responsive recording apparatus upon contact of the device with the said recording apparatus in the chosen position of the latter within the line of pipe. The source of current or battery for initiating the operation of the recording apparatus or assembly may also be contained within the housing for the recording apparatus, in which case the initiating device would function primarily as a circuit closing or terminal bridging element to initiate the operation of the recording apparatus. The steps and constructional details whereby such a circuit is closed comprise an important part of my invention, and the separate body may be an object dropped into or moved within the bore hole, which body is electro-conductive or includes an electro-conductive part. And, my invention includes means whereby initiation of the operation of the survey recording apparatus within the bore may be indicated to the operator exterior of the bore. In constructions embodying the foregoing features, it is advantageous in the practice of this invention that relatively insulated terminals or contacts of the local circuit are located exteriorly of the casing containing the apparatus and so constructed and located that cooperation of a circuit closing means therewith may be readily accomplished in the practice of this invention. And, for the making and preserving of records of the amount of inclination of the bore, the electro-responsive apparatus includes mechanism that is normally inoperative and which will make a record of the amount of inclination and which may also provide for making such other record or records as are useful in bore hole surveys. Moreover, such apparatus is so constructed in accordance with this invention that after the record of the amount of inclination is made, the recording apparatus is brought to a setting or condition in which destruction or mutilation of the record is effectively prevented.

Another feature of the invention is that the apparatus for effecting the desired operation, such as the making of a desired record, includes constructional details whereby a controllable period of delay is insured between the energizing of the local circuit and the making of the desired record, to the end that the recording apparatus may assume a state of quiescence prior to the instant of the making of the record, in spite of violent agitation thereof which may have occurred prior to or at the time when the making of the record is initiated.

In accordance with this invention the apparatus for effecting the desired operation, such as the making of desired records and particularly records of the amount of inclination of a bore hole is contained within a casing capable of withstanding the conditions existing in the bore hole, the casing preferably being permanently and effectively sealed; and such a casing may be supported within the line of drill pipe at any desired position therein.

In the embodiment of my invention herein illustrated, the apparatus for effecting the desired operation includes a local circuit, the terminals of which are relatively insulated and brought to the exterior of the casing for cooperation with a circuit closing member moved relatively to the casing into contact with the terminals to complete the circuit whereby initiation of the desired operations is effected.

Other and further objects and advantages and features of my invention will appear from the following description of illustrative embodiments thereof above referred to. And, it is to be noted that various features of this invention may be advantageously used separately and that various features thereof also cooperate when used conjointly to produce results not obtainable by the separate use of the features.

In the accompanying drawings wherein like reference characters indicate similar parts:

Fig. 1 is a sectional view, in elevation, of the upper part of the survey apparatus, showing the initiating device in operative position and making contact to establish the circuit of the electro-responsive means within the sealed part of casing which houses the recording assembly.

Fig. 2 similarly is a sectional view, in elevation, and constitutes a downward continuation of the showing of Fig. 1.

Fig. 3 illustrates, in section, a detachable unit or case containing a length of fuse and electro-responsive means for igniting the inner end of the fuse.

Fig. 4 is a section on the line 4—4 of Fig. 2.

Fig. 5 is a section on the line 5—5 of Fig. 1.

Fig. 6 is a sectional view, in elevation, showing the cross-section of an earth boring containing a boring tool supported by a drill pipe and a survey instrument, in accordance with this invention arranged within the drill pipe and supported thereby.

Fig. 7 is a section on the line 7—7 of Fig. 2, illustrating principally the rectangular cross-section of the plumb-bob 8.

Referring now to the drawings, which illustrate one practical embodiment of this invention, Fig. 6 shows an operative assembly of a drilling or boring tool I connected with and supported from the lower end of a stand of drill-pipe 2, the latter being positioned within a bore-hole, of which the inclination at some chosen point along its length, is to be determined. This part of the apparatus illustrated, i. e. the boring tool and its supporting drill-pipe, is conventional and forms no part of the present invention. The bore-hole, as well as the drill-pipe, is shown broken away at two points along its length to indicate that the boring may be of any depth, and that the survey instrument of this invention, indicated generally by the reference character 3, is positioned within the drill-pipe and supported therein in a manner to be hereinafter described. In this embodiment of the invention the survey instrument is positioned in the drill-pipe as the latter is formed by joining stands, and will usually be placed to be supported by a joint near or adjacent the cutting tool I. Obviously, however, the survey instrument may be located or positioned at any desired point along the length of the drill-pipe, and may be supported therein by other means than that illustrated in this specific embodiment.

The detail construction of the survey instrument 3 of this invention is illustrated in the sectional views of Figs. 1 and 2. In considering these figures, let it be understood that Fig. 2 is a continuation of Fig. 1, and is to be read as though alined with Fig. 1 and continued downwardly therefrom. With this explanation, it will be seen that the survey instrument 3 is constructed to be enclosed or housed within an elongated cylindrical tube or casing 4, of a diameter preferably somewhat less than the inside diameter of the drill-pipe, and this casing is tightly closed and sealed at its lower end by a threaded plug 5, a part of which plug is shown at the bottom of Fig. 2, and one form of the complete plug being more fully shown in Fig. 6. At its upper end the casing 4 may be threaded into a flanged sleeve-element 6, the flange of which serves to support the instrument at any chosen joint in the drill-pipe, as illustrated in Fig. 6. The use of such a flange support for the practice of this invention is not essential however, and the instrument may be otherwise supported as by permitting its lower end to contact e. g. with the upper surface of the cutting tool 1 within the drill-pipe; and for such support, the lower or plug end 5 of the instrument may be constructed in the manner shown (Fig. 6) as will not obstruct circulation of fluid through the pipe to the cutting tool, and also will serve to aid in maintaining the instrument in a substantially axial position with respect to the drill-pipe.

It is an important feature or characteristic of this invention that the recording mechanism of the survey device shall be completely enclosed in a water-tight casing and that there be no moving element extending through the casing to require the use of packing elements or glands which are hazardous mechanical expedients at the pressures encountered in deep boring. Accordingly, in the practice of this invention, the survey recording mechanism, by which a measure and record of angles is made, is contained and hermetically sealed within the casing 4, and between the plug 5 at the bottom already described, and a plug 7 shown in Fig. 1 slightly below the mid-section of this figure. The plug 7 is shown as interlocking with the casing 4, and it is preferably welded thereto. Within the casing 4, and sealed therein between the plugs 5 and 7, there is mounted the recording mechanism and such associated elements as take part in the control of the recording operations, and which elements are effective to delay the actual making of a record for a short interval of predetermined duration, after the instant of initiating actuation.

This delay action also constitutes an important feature of this disclosure and will be more fully hereinafter explained in connection with the details of the structure which make the delay feature operative.

For illustrative purposes only, the measurement and recording of vertical angles or inclination has been selected in the present embodiment of the invention, but it will be evident from this disclosure that the invention includes in its scope the measurement and recording of other values such as may readily occur to one skilled in the art.

For measuring vertical angles, use is made of a pendulum or plumb-bob device 8 which is supported for swinging movement within the sealed part of the casing 4. See Fig. 2. The record receiving part of the instrument comprises a circular record disk 9, of paper, celluloid, cardboard, or other similar material, capable of being indented or punctured by a sharply pointed end or stylus 10 at the lower end of the plumb-bob 8. The record making assembly, including the plumb-bob 8 and record disk 9 together with suitable supports for these devices is mounted within an instrument shell 11 which comprises a tubular element having parts of its wall cut away, and which in assembly, may be slid into the casing 4. By this expedient the entire recording assembly comprises a unit which may be conveniently inserted in or removed from the casing.

The plumb-bob 8 for the major part of its length, is rectangular in cross-section as shown in the sectional view of Fig. 7. Such shape provides flat surfaces which serve effectively to damp the swinging movements of the bob by their resistance offered to the atmospheric medium which is at all times confined within the casing. At its upper end the bob may be cored to receive a threaded plug 12 by which a supporting line or cord 13 is secured to the bob, the knotted lower end of the cord being received with the recessed end of the bob beneath the plug 12. To support the plumb-bob, a disk or plug 14 is mounted within the shell 11 and secured or fixed thereto in any convenient manner. The plug 14 is recessed axially on its upper side, the recess being threaded internally to receive a short screw or bolt-like element 15. The latter element is drilled axially and in vertical alignment with a small axial passage through the plug 14, the suspending cord 13 for the plumb-bob passing through both elements and being adjustably secured to castellated extensions 16 on the upper end of element 15. The proper positioning of the bob vertically within the instrument shell 11, and its correct spacing from the record disk 9, may be approximated by adjusting the length of the cord 13 from the castellated extensions 16; while for a more precise adjustment, the bolt 15 may be turned on its thread so as to move relative to the plug 14. A spring finger 17, fixed to the plug 14 bears against the periphery of the bolt 15 and serves to maintain the bolt in a properly adjusted position. Between the plug 14 and the bob 8, a cushioning element 18 is positioned, the under surface of which is cut away to provide a hemispherical cavity that is symmetrical with respect to the upper end of the plumb-bob. The element 18 serves to cushion upward thrust of the plumb-bob in the actual recording operation, as will be explained, and acts to assist in so holding the bob after completion of a record making operation, as to preserve the record. A retaining ring 19 fitting tightly within the instrument shell 11 supports and secures the cushion 18 in its proper relative position as shown in the drawings.

In the recording operation of the apparatus, the recording disk 9, together with its supporting structure is projected upwardly, and the stylus point 10 of the bob indents or pierces the circular record member 9, the mark of the stylus on the disk, by its position (radial distance from center of disk) constituting a measure of the angle which the axis of the plumb-bob makes with the vertical. The disk 9 is secured to the flat upper end of a slidably mounted sleeve member 20, a peripheral clamping ring 21 serving to detachably secure the disk in operative position thereon.

The member 20 is constructed with a hollow cylindrical dependent portion 22 that is received or telescopes within a similar hollow upwardly extending cylindrical part or sleeve 23 of the member 24. A pin and slot connection between the sleeves 22 and 23 guides the movement of the member 20 when it is released for upward movement in the recording operation. The pin is secured in the outer relatively fixed member 24, and extends into the vertical slot that is provided in the movable member 20. The detail showing of this construction is illustrated in the sectional view Fig. 4. The member 24 is detachably secured to a plug or disk 25, and the latter is fixed or secured to the instrument shell 11. In order to maintain a definite rotational position for the member 24 with respect to the instrument shell, a dowel pin 25' is secured to the plug 25 and projects from the upper surface thereof so as to enter a recess that is formed to receive it in the lower surface of the member 24. Provision is made for projecting the member 20 upwardly, for record making purposes, by an impulse from a coil spring 26 which latter surrounds the upper end of the sleeve 23, has its lower end fixed thereto and with its upper end bearing against the under-side of the top of member 20, which carries the record disk 9. In the relative position of parts shown in Fig. 2, the spring 26 is compressed and effective to thrust the member 20 upwardly upon release of a trigger holding means or latch, comprising a spring or yielding member 27 that is secured within the hollow sleeve 22 and has its lower end 28 of hook shape and bent so as to project through a slot in the lower side wall of sleeve 22 and also through an alined opening in the side wall of the sleeve 23. So long as the end 28 of the latch member 27 is maintained in the position shown in Fig. 2, no relative movement of parts or members 20 and 24 is permitted, and therefore the recording function of the apparatus is restrained. To secure the end 28 of the latch member in the latching position as shown, a combustible element or fuse 29 is passed around the waist section of the element 23 and beneath the hook 28. This arrangement of the fuse, in its unburned condition, is effective to retain the parts in operative but inactive condition; and burning of the fuse destroys the same to an extent that it will release the trigger element, whereupon the coil spring 26 becomes effective to project the member 20 upwardly and at the same time withdrawing the trigger end 28 of the latch member 27 from its holding position.

Within the instrument shell 11, and supported beneath the recording assembly above described, one or more additional recording assemblies may be mounted for the purpose of securing a series of records of angles in a survey; and for operation of such recording assemblies, the same fuse or combustible element 29 is, or may be, continued downwardly within the casing from the position shown in connection with the trigger 27, so as to operate in a similar way to release such other recording assemblies as it may be desirable to provide. It will be understood that when two or more recording assemblies are included in a single instrument, their release for functioning by the burning fuse will effect a sequence of recording operations which are almost simultaneous in view of the rapid rate of combustion of the fuse.

The lower end of the instrument tube 11 is closed by a threaded plug 30 provided on its under-side with an annular recess which affords a retaining seat for a coiled spring 31 interposed as a cushioning element between the instrument shell 11 and the plug 5, the latter as already described tightly closing and sealing the lower end of the casing 4. The cushioning spring 31 must be of such proportions as to not only yieldingly sustain the entire weight of the instrument shell 11 and the recording assemblies carried thereby, but to also maintain the entire assembly against a fixed abutment associated with the plug 7 (see Fig. 1) for the purpose of making and maintaining an electrical contact for a purpose to be described.

The combustible fuse method of release for the recording operation, affords a convenient and novel means of securing a desired, and perhaps necessary interval of time or delay between the instant of time when the operation of the apparatus is initiated, and the time when the actual record making movement of parts takes place. The desirability or necessity for this delay or dwell in the operation of surveying borings has been pointed out in a preceding statement of the objects of this invention. To get this delay in operation, the present invention contemplates use within the apparatus of a substantial and predetermined length of fuse, one end of which is to be ignited as the operation of the device is initiated; and the burning of the fuse will require a chosen predetermined amount of time before it is consumed by progressive burning along its length to the point of its cooperation with the first trigger element 27.

It has been found expedient to enclose the fuse, for so much of its length as in burning provides the delay interval in the recording operation, within a container or receptacle, the detail construction of which is illustrated in the sectional view Fig. 3. This receptacle is preferably a thin wall metallic container indicated by reference character 32, and as shown in Fig. 1, is supported within the instrument shell 11 by a lug 33 which projects from the inner surface of the shell wall and includes an upstanding lip that is preferably arcuate in shape to conform to the circular outline of the bottom edge of the fuse container. The top of the receptacle is received and retained by a spring clip 34 which, in addition to aiding in maintaining the receptacle 32 in an upright position, serves also as an electric contact finger in a circuit arrangement that will be hereinafter described.

Within the receptacle 32 a desired length of the fuse 29 is conveniently arranged as by coiling, and the inner end of the fuse is inserted into the lower end of an igniting cartridge 35. The latter cartridge contains, at its end adjacent the inserted fuse end, a charge of priming powder surrounding an electrical thermal element or hot-wire 36 to which a heating current may be conducted by suitable lead wires one of which is electrically connected with a contact stud 37 projecting through the top of the receptacle; and the other wire makes an electrical connection with the metallic wall of the container or receptacle 32. Passage of electric current to the thermal element 36 of the cartridge will readily heat such element to incandescence. This heat will be sufficient to ignite the surrounding charge of priming powder and the adjacent end of the fuse 29 will be thereby ignited. The fuse 29 extends through an opening in the side wall of the container 32 near the top thereof, and passes downwardly therefrom in a slot or groove 38 that is arranged in the external surface of the instrument shell 11. The detail of this slot is illustrated in the sectional view Fig. 4. The fuse is brought through an opening to the interior of the shell 11 in the vicinity of the waist-section of the sleeve member 24 (see Fig. 2), and passes around the latter to cooperate with the trigger member 27 as has been already described. From this recital of structural detail, it will be understood that when the fuse is ignited, as by the indicated electrical means, its burning is begun within the receptacle 32, and the burning of that part of the fuse within this enclosure will require a definite amount of time, the length or duration of which can be conveniently controlled by initially selecting a suitable length of fuse. As the fuse burns beyond the confines of the receptacle, it will burn downwards along the groove 38 and around the waist of the element 24, and then reach the latch end 28 of the trigger element 27, and since the fuse is substantially consumed in the burning, the restraining action of the unburned fuse which prevents the tension of the trigger element 27 from drawing its latch end 28 into the sleeve 22 is destroyed, and the member 20 of the recording apparatus is free to respond to the upward thrust exerted by the coil spring 26. The fuse may be carried beyond the single recording assembly shown to other angle recording assemblies which may be included within the casing 4; and in passing to such additional apparatus with which it may cooperate to similarly effect a release of recording operations, it again passes through an opening to the exterior of the instrument shell 11, and along a downward continuation of the groove 38 to a point in the length of the shell where it is again brought to the interior thereof in convenient position to engage and restrain a trigger element of the same or similar construction as already described. Within the container 32 it is advantageous to use a fibrous or other filling material 39 which serves the double function of slightly spacing adjacent convolutions of the fuse, and also effective to absorb and retain solid matter in the fumes resulting from combustion of the fuse. Without some means for confining or condensing these fumes, it is found that the interior of the apparatus is apt to become coated with a gummy deposit which presents certain objectional aspects, and in some cases may require a complete and thorough cleaning of the entire recording apparatus after each recording operation.

A circuit for conducting current to the hot-wire 36 includes, on the one hand, the instrument shell 11, casing 4, and the receptacle 32, all of which are metallic and make electrical connection with each other; and on the other hand, and insulated therefrom, there is provided the spring contact finger 34 which is supported by an axially disposed threaded member or bolt 40. The latter is carried by, but insulated from, the plug or cap 41 which closes the upper end of the instrument shell 11. The head of bolt 40 is in electrical contact with the lower end of a second bolt 42 and is pressed or urged into such electrical contact by the action of the coiled spring 31 which as already described is positioned beneath the lower end of the shell 11 and exerts an upward thrust thereon. The bolt 42, is entirely insulated from the plug 7, and the surrounding insulation is such that when a nut is applied and the bolt secured in position in the plug 7, the insulation will be compressed to tightly seal that part of the casing 4 containing the recording apparatus against the entrance of water or liquid even at the substantial hydrostatic pressures which exist at low levels in deep wells. The upper end of the bolt 42 constitutes one exposed electrical contact or terminal for the circuit of the hot-wire 36 of the fuse igniting cartridge 35; and the casing 4 constitutes the other contact terminal or side of this circuit. Obviously then, it only requires a current-source to be connected with these contacts in order for current to reach the hot-wire 36 and to initiate the operation of the recording assembly.

By the particular arrangement of the bolt 42 with its headed end extending beyond the sealed enclosure of the recording assembly, the invention provides a construction which obviates the necessity of any moving part extending through the walls of said casing to endanger the effectiveness of the instrument seal, and the construction described insures that this seal will be effectively maintained at all times and under all operating conditions including such excessive hydrostatic pressures as are encountered in deep wells.

As has been already pointed out, the apparatus as thus far described, may be supported in the drill pipe and remain therein during an entire drilling operation; or, the device may be lowered into the drill pipe at any desired time during the progress of the drilling operation for the purpose of making a survey record. In either event, the apparatus will remain inert or inoperative so far as actual recording operation goes, until the circuit of the igniting cartridge is closed by a suitable source of electric current. To thus close the circuit and supply current to ignite and start the burning of the fuse within the sealed part of the casing 4 is to initiate the operation of the recording apparatus, and the method and means for accomplishing this initiating step will now be described.

Referring to Fig. 1, the casing 4 extends upwardly beyond the plug 7, and is adapted to receive, through its open upper end, an entirely separate and independent device that is designed to be put into the drill pipe from the top of the well and passed along the pipe until it reaches the position shown in Fig. 1. The lowering of this device into the boring, and into its illustrated operative position is done only at such time as when it is desired to render the survey instrument operable to record an angle reading or readings. The upward extension of the casing 4, and above the plug 7, is provided with two sets of circulation openings in its side walls to permit the free flow of mud-laden liquid that must be constantly pumped or circulated through the drill pipe during drilling operations. One such set of openings is located just above and adjacent the plug 7. These openings are indicated at 43. The second set of openings in the casing 4 is located somewhat below the collar 6, and indicated by reference numeral 44. The openings 43 serve to cause the fluid to keep the upper end of the plug 7 and contact member 42 scoured free of metallic particles of rust and scale which may fall downwards within the pipe.

The separate device for initiating operation of the apparatus, and shown in operative position within the upper end of casing 4 in Fig. 1, is of projectile outline, and of outside diameter to fit and slide within the casing 4. The device comprises upper and lower parts as viewed in Fig. 1, which are coupled end to end by a threaded coupling or connection. The lower part 45 is made hollow or cored, and is constructed to house and contain one or more dry cell batteries 46. These are grouped in the usual way for series electrical connection, and are spaced from the side walls of the cavity in which they are held by an insulating sleeve. At either end, the group of batteries is held spaced from the ends of the cavity by coil springs 47 and 48 which serve to cushion the battery elements as well as to make electrical contact with the exposed battery terminals.

The lower end of the part 45 terminates in a conical projection comprising the headed end of a bolt 49 which is secured rigidly to the said part while being electrically insulated therefrom. The lower rounded end of the bolt 49 serves as an exposed terminal for the battery current and when in contact with the head of bolt 42, as shown in Fig. 1, will establish one side of the circuit required for igniting the fuse end in the cartridge 35. The shank of the bolt 49 makes connection with one terminal of the battery through a follower disk engaging one end of the spring element 47, the latter being in contact with the battery terminal. The opposite battery terminal, through the other spring element 48, makes electrical contact with the part 50 and from this the electrical connection is established with the casing 4. By the described current path, and with the initiating device in the position shown in Fig. 1, current will flow to the hot-wire in cartridge 35 and the fuse will be ignited.

The upper part of the initiating device, is indicated generally by the reference numeral 50. The function of this part of the device is to temporarily control the flow or circulation of the fluid medium that is ordinarily required to be pumped through a drill pipe to the cutting tool in drilling operations, and by such control to provide a signal to the operator at the surface, at the instant the circuit contact is established to initiate the operation of the recording device. Precisely how this signal is given, and how it is employed to facilitate the making of a record in accordance with this invention will be explained more fully in the statement of operation of a survey which is to follow. The upper part 50 of the initiating device comprises a hollow cylinder element which is of two bores, the lower one being the larger: and a piston element 51 is provided and dimensioned to slide snugly in the upper bore to normally occupy the position shown in Fig. 1. In this position, its upper enlarged end closes the bore of the cylinder to prevent passage of fluid therethrough from above. Downward movement of the piston, however, uncovers the ports or openings 52 in the side walls of the cylinder member 50, and some of these openings being in registry with openings 44 in the casing 4 (see Fig. 5), circulation from within to the outside of the casing 4 is established.

The lower enlarged end bore of the cylinder 50 is designed to be filled with a light grease or other semi-fluid body, having viscosity effective to normally support the weight of the piston in its illustrated upper position. The lower end of the piston 51 is drilled axially and transversely as shown, to provide passages through which the grease from the lower end of the cylinder may discharge when the piston under pressure is forced downwardly into the enlarged end bore of the cylinder. This downward movement, at first, will be slow and retarded by reason of the small outlet for the trapped grease; but when the enlarged lower end of the piston passes completely into the larger cylinder bore, the grease finds an easy outlet around the piston enlargement and may freely discharge into the drill pipe through the fluid openings 52 and 44. The result of the increased discharge of grease is to permit the piston to move rapidly to the low dotted line position of Fig. 1, and in so doing the upper piston enlargement uncovers the openings 52 to establish fluid communication from the inside of the casing 4 through passages or openings 52 and 44, the path of this flow being indicated by an arrow. Fig. 1.

To make an effective metallic contact between the initiating device and the casing 4, in order to insure electrical contact, the said device at the top thereof in Fig. 1, is provided with a spring finger 54 which normally extends beyond the periphery of the device to firmly engage the inner wall of casing 4 when the device occupies an operative position within the casing as shown.

The initiating device herein disclosed, may be broadly considered as self-contained means for carrying current, or a source of current, to an apparatus at any position within a boring and which may be at any position within a boring. Such apparatus obviously may be other than the specific recording means described in this application. The device therefore has the capacity for a wide variety of uses in connection with bore survey work, as well as in drilling operations; and in cooperation with other means by which its use temporarily controls the circulation of fluid along, or through the drill-pipe, it affords a very valuable and useful adjunct in many operations. Notable among these advantages is that it entirely obviates the use of wires or cables in a drill-pipe; and since the device is placed in the boring only at the time when current is required to initiate an operation, the batteries which it carries are less liable to be adversely affected by the excessive temperatures that may be encountered at low levels in deep wells and will not be discharged by conduction through the fluid in the well which contacts with the exposed terminals.

The method of use of the apparatus described is briefly as follows:

The recording assembly, mounted within intrument shell 11, is positioned and properly sealed within the casing 4, and the latter is then placed within the drill-pipe 2 supported either at a joint as shown in Fig. 6, or resting on the cutting tool 1 at the bottom of the drill-pipe.

In either position its construction and manner of support is such as to permit substantially unobstructed circulation of fluid along the drill-pipe to the cutting tool, the liquid flowing into the open end of the casing 4, and escaping through the outlet openings 43 and 44 to the interior of pipe 2 and to the cutting tool 1 through the usual outlet openings that are provided therein. From this it will be understood that in putting the apparatus of this invention into a drill-pipe, it occasions no appreciable obstacle to the carrying out of the usual drilling or other operations that are required in oil well or other earth borings. The construction of the casing 4 and the therein contained recording assembly is such that this much of the apparatus may be positioned in the drill-pipe and the drilling operation may proceed to any desired extent before a recording operation is initiated. Or, the apparatus, without the collar 6, may be put into the drill-pipe and passed therealong to take a position resting on the cutting tool 1 at any stage of the drilling operation.

With either method of placement of the apparatus in the drill-pipe, the functioning of its recording operation is dependent upon a subsequent movement or lowering of the initiating device to make contact therewith and supply current to the circuit of the igniting cartridge. Once the fuse is ignited, it burns progressively, at first within the receptacle 32, and thence along the length of the fuse until by its continued burning the trigger end 28 is released. When this happens, the sleeve element 22 with upper enlargement or table 20 carrying the record disk 9 is released, and at once is projected upwardly in a guided rectilinear path bringing the record disk into contact with the pointed end or stylus 10 of the plumb-bob 8. If the axis of the bore hole is not vertical, the stylus marks or perforates the record member 9 at a point radially spaced from the center of the said record member, the radial distance of the point of contact from the center being a precise measure of the angle of inclination of the apparatus to the vertical; and since the apparatus will be inclined to the same extent as the drill-pipe and the latter as the boring, the record thus made will measure the vertical angle of inclination of the boring. When the record member contacts with the stylus point 10, it preferably is moving at a rate that insures a record being made at the instant of such contact, and continued upward movement of the record member raises the plumb-bob until its upper end is firmly pressed into contact with the resilient cushion 18. With the plumb-bob thus supported and yieldingly held, there is no opportunity for its further movement as by jarring of the apparatus, and it will be effectively maintained in this position and without damage to the record until the apparatus is removed from the pipe when the parts can be easily separated and the record examined. The resilient cushion 18 also serves to protect the flexible suspension member 13 from damage through being crushed by the upper end of the bob.

The fuse, after its burning has released the trigger 27 by freeing the end 28, will continue to burn along its downward extension to other angle recording assemblies which may be included and similarly arranged for operation within the casing 4 and beneath the above described recording assembly. A duplicate recording assembly affords a valuable check on the readings or angle measurements that this apparatus provides. Thus with two separate readings in exact accord, the accuracy of the survey results is conclusively established.

To provide information for indicating to the operator at the surface that the apparatus is about to make a record, is the further purpose of this invention and is accomplished as follows:

When it is desired to take a reading in a boring, the initiating device is placed in the drill-pipe with its pointed end downward, and it moves by gravity, and also in response to pressure of the circulating fluid that is being pumped downward through the drill-pipe, into the position within the upper open end of the casing 4 as shown in Fig. 1. The pressure of the circulating fluid assures the downward movement of the initiating device in the drill-pipe even where the drill-pipe inclination might be so great that gravity effect would be insufficient to cause such movement. Immediately it reaches this position, the circuit for igniting the fuse is established, and also at the same instant the fluid circulation through the pipe is cut off by the piston element 51 which is in its upper position in the cylinder 50 and therefore closes the openings 44. This sudden stopping of circulation through the drill-pipe is almost instantly evidenced by a characteristic noise made at the surface by the action of the pumps in slowing down as the pressure of the pump discharge suddenly rises. This noise of the pumps is a signal to the survey operator that the initiating device has successfully reached the survey apparatus in the lower part of the drill-pipe and that the recorder time control apparatus has thus been set in operation. Upon hearing this noise which is followed, after only a brief interval, by racing action of the pumps indicating that circulation is restored by the downward movement under pressure of the piston 51, the operator quickly acts to stop the pump in order to reduce disturbances in the well that may result from the fluid circulation passing the survey instrument, and thus provide as favorable conditions as possible for the actual recording operation. The time required for complete burning of the fuse and thus to insure that all recording assemblies have been actuated being known in advance, the cessation of pumping need only last for a short interval (a few minutes) when the pumps may again be put in operation and, if desired, the drilling operations renewed without damage to the records that have been made. When next the drill-pipe is removed from the boring the survey instrument is removed from the pipe, and the recording assembly taken apart for examination of its record. To make the apparatus ready for further service involves only the simple operations of supplying a new fuse and record disk and resetting the movable elements into their proper relative positions as shown in Fig. 2. The initiating device, depending on the length of time it has remained in the well may require new batteries, and after each operation it will always require a recharging of grease to be placed beneath the piston element 51.

Having now described my invention in detail, what I claim as novel and desire to secure by Letters Patent is:

1. In apparatus for determining inclination of a bore hole, the combination comprising a sealed casing adapted to be passed into the boring, an electro-responsive recording device within the casing, a local circuit for the said device including external contacts adjacent the exterior surface of the said sealed casing, and means for closing the said circuit including a member independently movable within the bore and exterior to said casing.

2. In apparatus for determining inclination of a bore hole, the combination comprising a sealed casing adapted to be passed into the boring, an electro-responsive recording device within the casing, a source of energy therefor, a local circuit for the said device, and a member to be separately moved along the bore to a point adjacent the sealed casing to close the said local circuit and thereby initiate the operation of the recording device.

3. In bore hole surveying apparatus, a sealed casing adapted to be moved along a bore hole, an external contact on the upper end of said casing, a separate device adapted to be inserted in the bore hole, said casing and device being relatively movable in said hole, electro-responsive recording mechanism within said casing and including a normally open electric circuit, and means whereby said circuit is closed upon movement of the said device into engagement with said contact on said casing within the hole.

4. In apparatus for determining inclination of a bore hole, the combination comprising a sealed casing adapted to be passed into and along the bore to any desired point thereof, and housed within the casing a recording assembly and combustible means for controlling the operation thereof, an electro-responsive device for igniting said combustible means also contained within the housing and having a local circuit including exterior spaced contacts adjacent the exterior surface of said casing, and means movable relative to the casing to connect the said contacts to initiate operation of the recording assembly.

5. In apparatus for determining inclination of a bore hole, the combination including a sealed casing adapted to be passed into and along the bore, a recording assembly within the casing, electro-responsive means for initiating operation of the recording assembly, the said assembly comprising means for making a record of inclination and combustible means arranged to be ignited by the said electro-responsive means for controlling operation of the second mentioned means, the said combustible means consisting of a length of fuse so chosen as to give a desired lapse of time between its ignition and the subsequent operation of the record making means thereby.

6. In apparatus for measuring angles within a bore hole, the combination including a sealed casing adapted to be passed into and along the bore to any desired point thereof, a recording assembly within the casing, combustible means for maintaining the said assembly normally inactive, and electro-responsive means operable to ignite the first mentioned means to initiate operation of the said recording assembly.

7. In apparatus for measuring angles within a bore hole, the combination comprising a sealed casing adapted to be passed into and along the bore to any desired point thereof, an angle recording assembly within the casing, combustible means also within the casing, the said means comprising a length of fuse one section of its length serving in its unburned condition to maintain the said assembly normally inactive and a contiguous section of the fuse of chosen length to be first burned and to require a predetermined interval of time for its burning in order to provide a delay element in the functioning of the recording assembly, and means operable to ignite the said combustible means to initiate operation of the recording assembly.

8. In bore survey apparatus of the character described, a record making assembly and control means therefor contained within a sealed casing and adapted to be passed into a bore hole, the said assembly comprising releasable means for making a record of inclination, electrically energized means for initiating operation of the apparatus and a local circuit therefor including a contact on the exterior of said casing and insulated therefrom, a delay element interposed between the last mentioned means and the releasable record making means and operable a predetermined time after initiating operation by the electrical means to release the recording means to make a record of inclination.

9. In apparatus for determining inclination of a boring, the combination comprising a sealed casing adapted to be passed into and along a bore, and within the casing an inclination recording assembly and electro-responsive means for controlling the operation thereof, and a portion of the casing extending upwardly beyond the sealed part thereof to cooperate with a separate device to be brought into contact therewith, the said extended portion of the casing constituting a part of the circuit of the said electro-responsive means.

10. In apparatus for determining inclination of a bore hole, the combination comprising normally non-operative recording mechanism adapted to be passed into the boring, and control means operable for setting the recording mechanism into operation, the said control means including a combustible element, a part of which is positioned adjacent the said recording mechanism so that the products of combustion of such part may contact directly therewith.

11. In apparatus for determining inclination of a bore hole, the combination comprising normally non-operative recording mechanism adapted to be passed into the boring, and control means operable for setting the recording mechanism into operation, the said control means including a combustible element and electro-responsive means for igniting said element to initiate operation of the apparatus, a part of said element being positioned adjacent the said recording mechanism so that the products of combustion of such part may contact directly therewith.

12. In bore survey apparatus of the character described, the combination comprising a recording assembly and means for controlling its recording operation including a timing device for delaying its actual recording action after the recording operation has been initiated, the said device consisting of a receptacle unit and within the same a predetermined length of combustible fuse the burning of which within the receptacle provides a desired delay in the operation of the recording assembly.

13. In bore hole survey apparatus for determining inclination of a boring, a sealed cylindrical casing containing an electro-responsive recording assembly and adapted to be passed into and along a boring, and a cooperative separate device also adapted to be passed into and along the boring and into contact with the said casing to thereby establish an electrical circuit to initiate operation of the said recording assembly, the said device comprising a protective housing for a source of electric current and having means for conducting the current from said source to the exterior surface of the device at points thereof which are electrically insulated from each other.

14. In bore hole survey apparatus of the character described, an electro-responsive recording apparatus, a sealed casing therefor, and an initiating device adapted to be dropped into the bore hole and to close a circuit to initiate the operation of said recording apparatus, said device being of smaller diameter than the diameter of said casing.

15. In bore hole survey apparatus of the character described, an electro-responsive recording apparatus adapted to be positioned in the bore hole at the point where the survey record is desired, said apparatus embodying a sealed casing provided with an external contact at the upper portion thereof, and an initiating device therefor adapted to be dropped into the bore hole and move into engagement with said contact, said initiating device including a battery for energizing said electro-responsive recording apparatus.

16. In apparatus for determining inclination of a boring, the combination comprising a plumb-bob, a flexible suspension member therefor, a rigid support for the upper end of said member, an elastic cushion between said support and the upper end of said plumb-bob, a movable record member below said plumb-bob and means for moving said record member into engagement with said plumb-bob to make a record of inclination and to carry the plumb-bob upwardly into engagement with said cushion.

17. In apparatus for determining the inclination of a boring, the combination comprising a plumb-bob with a sharp pointed lower end, a flexible suspension member therefor, a rigid support for the upper end of said flexible member, resilient cushioning means between said support and the upper end of said plumb-bob, a movable record member below said plumb-bob, means for moving said record member into engagement with the pointed lower end of said plumb bob to make a record of inclination in the form of an indentation on the upper surface of said record member and to carry the plumb-bob upwardly into engagement with said resilient cushioning means and to clamp the plumb-bob between the record member and the cushioning means.

ALEXANDER ANDERSON.